United States Patent Office 3,462,954
Patented Aug. 26, 1969

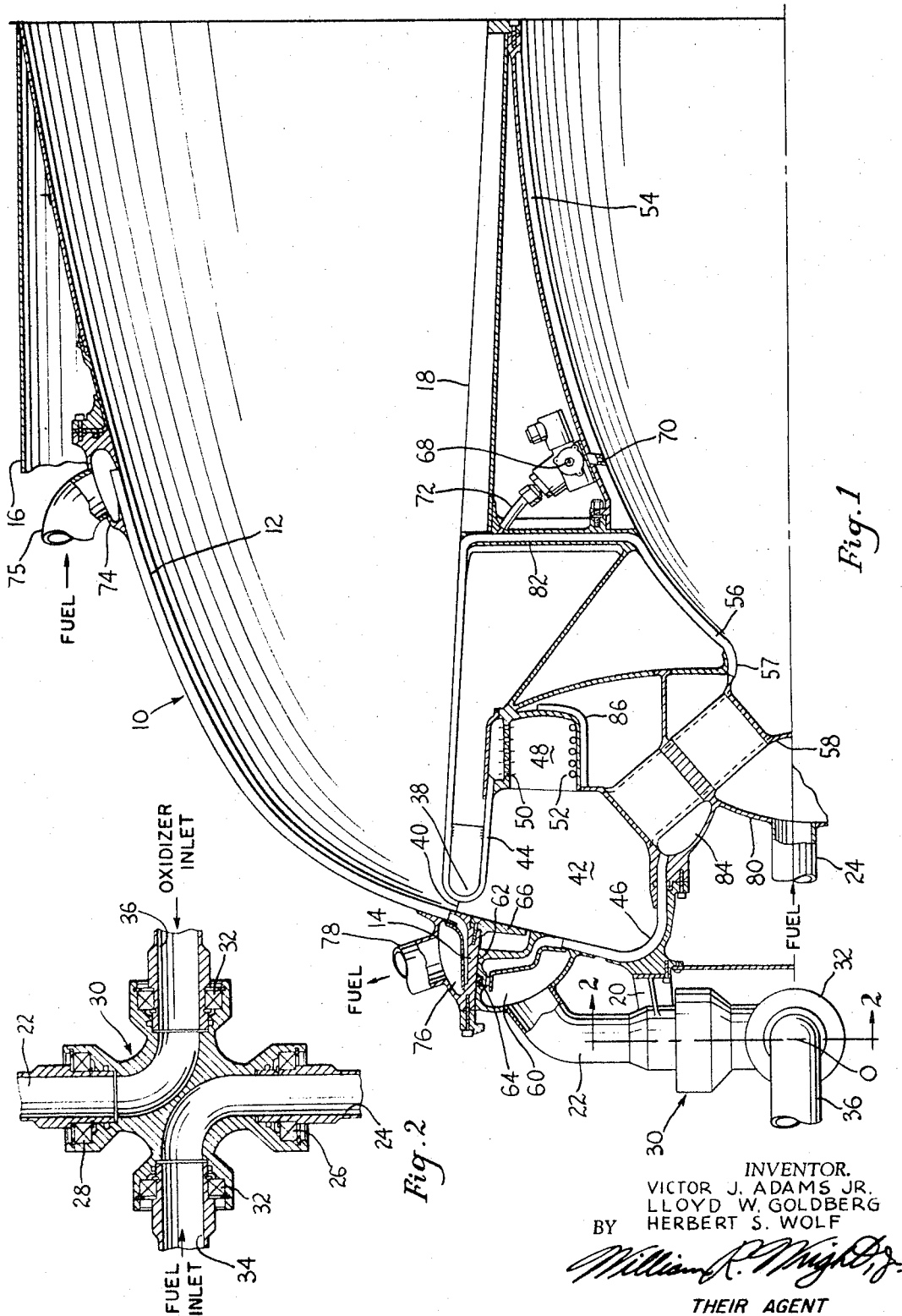

3,462,954
ROCKET THRUST CHAMBER
Victor J. Adams, Jr., Parsippany, Lloyd W. Goldberg, Clifton, and Herbert S. Wolf, Denville, N.J., assignors to Thiokol Chemical Corporation, Bristol, Pa., a corporation of Delaware
Filed Mar. 10, 1965, Ser. No. 438,514
Int. Cl. F02k 1/20; B64c 15/08
U.S. Cl. 60—228   13 Claims This invention relates generally to rocket powerplants and more particularly to an improved acorn thrust chamber of the type disclosed in the copending application of Joseph J. Lovingham and Hartmann J. Kircher III, Ser. No. 247,443, filed Dec. 18, 1962.

The main object of the present invention is to provide an improved acorn thrust chamber for rocket powerplants which is gimbaled for thrust vector control and which is regeneratively cooled.

An important object of the present invention is to provide an improved, gimbaled, acorn thrust chamber for liquid propellant rocket powerplants which is gimbaled by the use of a secondary injection of the propellant.

Another important object of the present invention is to provide an improved acorn thrust chamber which includes primary and secondary combustion chambers with propulsive thrust being furnished by each.

A further important object of the present invention is to provide a balanced, gimbaled acorn thrust chamber for a liquid propellant rocket powerplant so as to provide a minimum load on the gimbal mount and a minimum of secondary propellant injection for thrust vector control.

A still further important object of the present invention is to provide a rocket engine of the acorn type which has a gimbaled primary and secondary combustion chamber mounted so as to eliminate all flexible propellant lines, and a secondary propellant injection means to afford vector thrust control.

Other objects and advantages of the invention will become apparent during the course of the following description.

In the drawings, we have shown one embodiment of the invention. In this showing:

FIGURE 1 is a central, longitudinal sectional view of the rocket engine comprising the present invention; and FIGURE 2 is a transverse sectional view of the gimbal mount for the engine, taken on the line 2—2 of FIGURE 1.

Throughout the specification the term "engine" refers to the primary and secondary combustion chambers including their exhaust nozzle, injection means, etc. while the term "powerplant" refers to the missile or vehicle to which the engine is attached including the engine, the tankage, conduits, controls, etc.

Referring to the drawings, numeral 10 designates the rocket engine as a whole which includes a generally hemispherical although somewhat ellipsoidal, exhaust and expansion nozzle 12 which is fixed to (as by annular bracket 14) or may act as the aft bulkhead of a rocket powerplant indicated as a whole as 16 having the usual propellant tankage, conduits, controls, etc.

A generally cylindrical acorn thrust chamber assembly 18 is mounted centrally of the primary expansion nozzle 12 by means of brackets 20 fixed to propellant conduits 22, 24 rotatably mounted in vertically spaced bearings 26, 28 in a gimbal mount indicated as a whole by numeral 30. The gimbal mount in essence is a Hook's joint capable of transferring fluids without leakage and includes a pair of horizontally-spaced bearings 32 which enables rotation of the mount 30 about two fluid propellant conduits 34, 36 which are fixed to the structure of the missile or powerplant 16.

The forward end 38 of the acorn thrust chamber assembly 18 is spaced from the expansion nozzle 12 to form a throat 40 and is provided with an annular primary combustion chamber 42 defined by outer and inner peripheral walls 44, 46 which terminate aft in an annular vortex propellant injector 48 having fuel injection ports 50 and oxidizer injection ports 52 (or vice versa) for hypergolic propellants which require no igniter.

The aft end of the acorn thrust chamber assembly 18 terminates flush with and has fixed thereto the exhaust end of a second expansion nozzle 54 which is similar in configuration to the primary expansion nozzle 12 and terminates forwardly in a secondary combustion chamber 56 having a secondary throat 57 which is rigidly secured to the inner primary combustion chamber wall 46 and communicates with the combustion chamber 42 by means of three hollow supporting ribs 58 which are equi-angularly spaced 120° from each other. It will be understood that during operation of the acorn rocket engine 10, a certain percentage of the combustion gases pass through the ribs 58 into the secondary chamber 56 and expand in the secondary nozzle 54 to furnish a portion of the total thrust of the engine.

The nozzles and walls of the engine 10 are of a hollow sandwich type construction to form fluid cooling conduits therein so as to regeneratively cool the entire assembly and nozzles. It is to be noted that the inner wall 46 of the primary combustion chamber 42 also forms its forward wall and extends forwardly and radially outwardly to also form the aft wall of the oxidizer inlet manifold 60 and terminate in a ring 62 mating with the under surface of the bracket 14 and having a seal 64. The mating surfaces are curved with the point O of the gimbal mount 30 as their center to permit free gimbaling of the assembly 18 with respect to the fixed primary nozzle 12 which includes an annular plate 66 forming a part of the front wall of the combustion chamber 42.

It will be appreciated that by making the diameter of the main chamber seal 64 approximately the same size as the primary combustion chamber throat 40, the load on the gimbal mount 30 is held to a minimum. This balances the pressure loading of the chamber 42 through the internal structure of the primary and the secondary chamber assembly 18 including the relatively movable front primary chamber walls 46 and 66.

The assembly 18 is provided with four secondary injection control valves 68 angularly spaced 90° around the secondary nozzle and communicating therewith by ports 70 and with adjacent coolant fluid flow passages by conduits 72. Thrust vector control is provided by injecting fuel through one or a combination of any of the four injection control valves 68 to gimbal the assembly 18 about the point O. This gimbaling causes the front end 38 to partially close certain portions of the primary chamber throat 40 and to more fully open other portions and thus provides for a change in direction of the primary thrust vector. The valves 68 are controlled on signal by conventional means (not shown).

The fixed primary nozzle is provided with an inlet manifold 74 which receives fuel from a conduit 75, and an outlet manifold 76 which has a conduit 78 communicating with the gimbal mounting conduits 34 and 24, the latter communicating with a fuel manifold 80 mounted on the gimbaling assembly 18. The fuel then passes through an intermediate wall 82 to the throat 38 and the injector 48. The gimbal mount conduit 22 delivers oxidizer to the inlet manifold 60, then around the seal 64 and through the passages of the wall 46 to a manifold 84, and passes between the ribs 58 to a collector ring 86 where it cools the aft side of the injector 48 before passing through the ports 52 into the chamber 42.

OPERATION

While the disclosure illustrates a structure for use with hypergolic fluid propellants, the principles of the invention are adapted to monopropellant, etc. operation. As shown, of the pressurized fuel and oxidizer contained in the powerplant, upon engine operation the fuel is fed through conduit 75 to the inlet manifold 74 from whence it flows at a controlled cooling velocity through the coolant passages of the hollow sandwich type construction of the nozzle 12 to the outlet manifold 76, through the conduit 78 to the gimbal mount conduits 34, 24 and to the inlet manifold 80 mounted on the acorn thrust chamber cylindrical assembly 18. The fuel now passes between the ribs 58 and through the coolant passages in the walls of the throat 57 and the secondary combustion chamber 56 through the intermediate walls 82 (from which fuel is tapped by the vector control injection valves 68), through the outer walls of the assembly 18, and forwardly around the end 38 adjacent the throat 40, through the outer wall 44 of the primary combustion chamber 42 and through the injector ports 50 into the chamber to mix with the oxidizer.

The pressurized oxidizer from the powerplant enters the gimbal mount 30 through the conduit 36, passes to the inlet manifold 60 by the conduit 22 and past the primary chamber seal 64 cooling it, and then passes through the front and inner primary chamber wall 46 to the manifold 84 and between the ribs 58 (as shown by the arrows) into the collector ring 86 where it cools the aft side of the injector 48 before passing into the primary combustion chamber through the injection ports 52.

Thus, the propellants regeneratively cool the entire acorn thrust assembly 18 including the primary and secondary combustion chambers and the secondary nozzle, and also the primary expansion nozzle 12. The propellants burn in the primary combustion chamber 42 and pass through the throat 40 to expand in the nozzle 12 to produce thrust while a portion of the burning gases passes through the hollow ribs 58 into the secondary chamber 56 to expand in the secondary nozzle and produce additional thrust.

As stated, the acorn thrust chamber assembly 18 is gimbaled to vary the thrust vector of the engine 10 by selectively injecting additional fuel through the ports 70 by means of the injection valves 68 into the flow of gases in the secondary chamber 56. This effects gimbaling of the assembly 18 about the mount 30 and its pivot point O to close off and enlarge portions of the primary throat 40 by the forward assembly end 38 to change the thrust vector.

It will now be appreciated that the novel acorn thrust chamber rocket engine described provides: a balanced chamber permitting minimum gimbal loads and minimum requirements for secondary injection as compared with bell nozzles for equivalent thrust tilt or gimbaling angles; a full regeneratively cooled injector and chamber assembly; and the elimination of all flexible lines.

What is claimed is:

1. The combination with a rocket engine having a hemispherical expansion nozzle and an acorn thrust chamber gimbaled thereon to vary the thrust vector of the exhausted gases when the engine is operating; of a secondary nozzle fixed to said chamber and means for injecting fluid transversely across and within said secondary nozzle to effect a reactive gimbaling of said chamber.

2. The combination recited in claim 1 wherein said thrust chamber communicates with said secondary nozzle and discharges a portion of the combustion gases therethrough to furnish additional thrust, and said injected fluid interferes with the flow of said discharged portion of gases to effect a dynamic imbalance of said chamber and gimbaling thereof.

3. The combination recited in claim 2 wherein said injected fluid comprises a propellant ignitable by said discharged portion of combustion gases.

4. The combination recited in claim 3 wherein said propellant first passes through the walls of the expansion nozzle, said thrust chamber and said secondary nozzle to regeneratively cool the same.

5. An engine for rocket powerplants comprising a generally hemispherical exhaust nozzle for attachement to the aft end of the powerplant, a cylindrical assembly gimbally mounted with respect to said nozzle and having a front end spaced from and defining an annular combustion chamber therewith, the walls of said assembly having fluid coolant passages, a second nozzle mounted on said assembly, and means mounted on said assembly for injecting coolant fluid from said passages into and transversely of said second nozzle to effect gimbaling of said assembly to vary the thrust vector of the combustion gases discharging from said chamber when said engine is in operation.

6. The combination recited in claim 5 wherein the forward end of said assembly defies the throat of said first-mentioned nozzle the width of which is varied by said gimbaling.

7. The combination recited in claim 6 wherein a seal of the diameter of said throat is interposed between said first-mentioned nozzle and said gimbaled assembly to effect a balancing of the latter with respect to the gimbal mounting.

8. The combination recited in claim 5 wherein said combustion chamber communicates with said second nozzle and discharges a portion of the combustion gases therethrough to provide thrust from said second nozzle, and said injected fluid interferes with the flow of said portion to effect an imbalance and gimbaling of said assembly.

9. The combination recited in claim 5 wherein said coolant fluid is a propellant.

10. The combination recited in claim 8 wherein said coolant fluid is a propellant.

11. The combination recited in claim 5 wherein said means comprises a plurality of conduits annularly spaced about said second nozzle and communicating therewith and with said coolant passages, and a valve controlling the flow of coolant fluid through each of said conduits.

12. The combination recited in claim 11 wherein said coolant fluid is a propellant.

13. A rocket engine comprising, in combination, a generally hemispherical expansion nozzle for attachment to a rocket powerplant, a cylindrical assembly gimbally mounted with respect to said nozzle and having a front end spaced from and defining an annular combustion chamber therewith, means mounted on said assembly for effecting gimbaling thereof to vary the spacing of portions of said end to vary the thrust vector of the combustion gases discharging into said nozzle from said chamber during operation of the engine, said nozzle, assembly, and chamber having walls including fluid coolant passages communicating with said combustion chamber and with said coolant comprising propellant combustible in said chamber to provide said thrust, a second nozzle fixed to the aft end of said chamber, and means for injecting said propellant transversely across and within said second nozzle to effect a reactive gimbaling of said chamber.

References Cited

UNITED STATES PATENTS

| | | | |
|---|---|---|---|
| 3,080,711 | 3/1963 | Connors | 60—35.6 |
| 3,131,537 | 5/1964 | Thielman | 60—35.6 |
| 3,151,446 | 10/1964 | Parilla | 60—35.6 |

SAMUEL FEINBERG, Primary Examiner